United States Patent [19]
Hoffman et al.

[11] 3,815,752
[45] June 11, 1974

[54] REFRIGERANT FILTER-DRIER

[75] Inventors: John E. Hoffman, Webster Groves; Ardell J. Schelich, Washington, both of Mo.

[73] Assignee: Sporlan Valve Company, St. Louis, Mo.

[22] Filed: Mar. 2, 1972

[21] Appl. No.: 231,198

[52] U.S. Cl................ 210/266, 55/387, 210/282, 210/289, 210/483, 210/DIG. 6
[51] Int. Cl........................................... B01d 27/02
[58] Field of Search.................... 55/387–390; 210/266, 282–284, 287–289, 356, 483–485, 509, DIG. 6

[56] References Cited
UNITED STATES PATENTS

| | | | |
|---|---|---|---|
| 2,067,439 | 1/1937 | Dooley | 210/483 X |
| 2,199,258 | 4/1940 | Gray | 210/DIG. 6 |
| 2,365,149 | 12/1944 | Anderson | 210/DIG. 6 |
| 2,460,084 | 1/1949 | Hebo | 210/356 |
| 3,175,342 | 3/1965 | Balogh | 55/389 X |
| 3,212,641 | 10/1965 | Komarmy et al. | 210/509 X |
| 3,308,957 | 3/1967 | Klein | 210/266 |
| 3,680,707 | 8/1972 | Zeek | 210/266 |

*Primary Examiner*—John Adee
*Assistant Examiner*—Robert H. Spitzer

[57] ABSTRACT

A filter-drier for refrigeration systems which includes a bed of adsorbent material contained in a housing, and a wire form of substantially conical or cylindrical shape disposed in the housing downstream of the adsorbent material bed, the wire form, when a substantially conical shape, having its larger end arranged toward the housing outlet and its relatively smaller end disposed toward the adsorbent material bed. A filter media of inorganic fibrous material is disposed in the wire form and assumes substantially the shape of the wire form. A pad of inorganic fibrous material is located adjacent to and downstream of the filter media contained in the wire form, and is held against the housing by the wire form to provide a seal to assure flow through the filter media. In the preferred embodiment, the filter media contained in the wire form and the pad are of fiberglass, and the wire form is a compression spring. The wire form is secured in an outlet housing section so that such section constitutes a self-contained subassembly, while the adsorbent material bed is contained by a foraminate structure that is secured to an inlet housing section so that such section constitutes a self-contained subassembly also. The two self-contained subassemblies are placed together and joined by a single weld.

9 Claims, 8 Drawing Figures

REFRIGERANT FILTER-DRIER

BACKGROUND OF THE INVENTION

This invention relates generally to improvements in a filter-drier for use on refrigerant systems, and more particularly to an improved filtering unit downstream of an adsorbent material bed and an improved assembly of the component parts.

There are basically two types of refrigerant filter-driers in common use today. One type employs a molded desiccant core which serves to remove moisture and acts as a filter media for filtration. The other type employs a bed of granular desiccant retained by perforated metal or fiberglass filter pads under spring pressure. The outlet end of the desiccant bed has a flat pad of fiberglass.

The molded core requires a large filtering area to effectively collect a large amount of dirt. The molded core is inherently expensive to manufacture because of the careful processing required in molding. Manufacturers of low cost, unitary air conditioning equipment require a filter-drier that is much less expensive than the core type presently on the market. The granular desiccant type, while less expensive, has not met this need because of several problems in performance.

The typical spring-loaded design with granular desiccant and fiberglass pad suffers from two severe problems. First, the fiberglass pad at the outlet end has a small area and therefore does not collect a large amount of dirt before blockage occurs. Furthermore, regardless of how the desiccant is held, some breakdown by attrition occurs. These desiccant fines then tend to plug the outlet filter pad.

The housing constructions of many filter-drier designs utilize a tubular section with an end cap at either end. This design is expensive because of the number of parts involved and the number of welds required to attach the housing sections together.

SUMMARY OF THE INVENTION

The present filter-drier has a relatively inexpensive construction and yet one that is a highly effective filter. The filter drier can be easily assembled, is simple in construction and with few parts.

A large primary outlet fiberglass filter media presents a large area for filtration and is much more effective in collecting a large amount of dirt and desiccant fines than a molded drier core or the small area provided by a flat fiberglass pad.

The ease of assembly of the filter-drier is obtained by the retention of the adsorbent material bed in a self-contained subassembly in one section of the housing, and the retention of the filter media in a self-contained subassembly in the other compatible section of the housing. These two self-contained subassemblies are placed together and the housing completed by a single peripheral weld.

In the filter-drier, a wire form of substantially conical or cylinder shape is disposed in the housing downstream of an adsorbent material bed. The wire form, whether conical or cylindrical, has one end arranged toward the housing outlet and its other end disposed toward the adsorbent material bed. A large filter media of inorganic fibrous material is disposed in the wire form and assumes the shape of the wire form.

An annular gasket may be located in and pressed against the housing to provide a seal, the gasket being located adjacent to and downstream of the filter media. A pad of inorganic fibrous material is located across and upstream of the gasket and is located adjacent to and downstream of the filter media contained in the wire form. It is preferred that the filter media contained in the wire form and the pad be of fiberglass. A satisfactory seal to the side wall of the housing can be achieved without the gasket by sandwiching the pad of inorganic fibrous material between the housing and the one end of the wire form.

Located and secured in the housing, is a foraminate means that contains the adsorbent material bed. This foraminate means can consist of a pair of spaced, perforated plates that extend across the housing. One end of the wire form engages one of the perforated plates, and the wire form is held between the said one perforated plate and the housing. In the preferred construction, the wire form is a compression spring.

One of the self-contained subassemblies of the filter-drier consists of the outlet housing section in which the wire form is secured, the wire form having one end arranged toward the housing section outlet and its other end arranged toward the opening defined by the outlet housing rim. The filter media is contained in the wire form.

The other self-contained subassembly consists of an inlet housing section in which the adsorbent material bed is contained by the foraminate means secured to the inlet housing section.

The pair of self-contained subassemblies are interconnected by placing the inlet and outlet housing sections together and joining the compatible rims with a single weld. In place, the spring is compressed between the said one perforated plate and the sealing gasket or outlet pad when the gasket is not used.

DESCRIPTION OF THE PREFERRED EMBODIMENT

Figure 1:
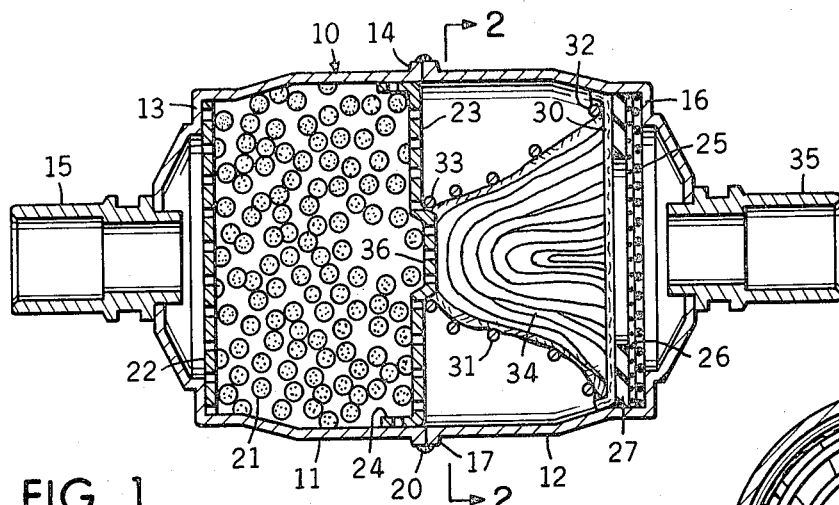
FIG. 1 is a longitudinal, cross-sectional view of the filter-drier.
Figure 2:
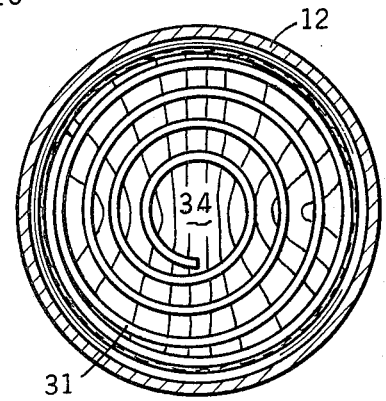
FIG. 2 is a cross-sectional view taken on line 2—2 of FIG. 1.

Referring now by characters of reference to the drawing, and first to FIGS. 1 and 2, it will be understood that the housing generally indicated by 10 of the filter-drier consists of an inlet housing section 11 and an outlet housing section 12. As disclosed, these housing sections can be identical in construction.

The inlet housing section 11 includes an inwardly facing shoulder 13, the purpose of which will be later described, and a peripheral rim 14 that defines the large opening of the housing section 11 before the housing sections 11 and 12 are assembled. An inlet fitting 15 is secured to the end of the inlet housing section 11, and provides the inlet to the filter-drier for the refrigerant, the inlet fitting 15 being adapted for attachment to a refrigeration line of a refrigeration system.

The outlet housing section 12 is provided with an inwardly facing shoulder 16, the purpose of which will be later described, and a peripheral rim 17 that defines the large opening of such housing section 12 before the housing sections 11 and 12 are assembled. The housing section rims 14 and 17 are compatible, and when placed in abutment as shown in FIG. 1, can be secured together by a single weld 20.

Located within the inlet housing section 11 is an adsorbent material bed 21 that is contained by a foraminate means consisting in the embodiment shown of a pair of spaced, perforated plates 22 and 23. The perforated plate 22 seats against the housing section shoulder 13. The perforated plate 23 is cup-shaped having a peripheral flange 24 that is pressed against or otherwise secured to the inside wall of the housing section 11 just inwardly of the opening defined by the housing rim 14. The perforated plates 22 and 23 contain the adsorbent material bed 21, and because the perforated plate 23 is secured to the housing section 11, this inlet housing section 11 constitutes a self-contained subassembly.

There are obvious structural equivalents that could be conveniently utilized. For example, the foraminate means could take the form of a screen or other porous material to retain the adsorbent material bed 21. This screen could be in the form of a flat disc or it could be in the form of a wire screen bag. The adsorbent material bed 21 could consist of molecular sieve because of its high water capacity. In some usages of the filter-drier, it may be advantageous to provide a percentage of activated alumina because of its acid removal ability and/or a percentage of activated charcoal because of its wax removal ability. Other possible desiccants with good attrition resistance which would be satisfactory include silica gel, sovabead and any other desiccant in ball or bead form. Granular desiccants such as charcoal which have sharp corners may not be satisfactory because of possible break-down by attrition in service.

Located in the outlet housing section 12 and seated against the shoulder 16 is a perforated metal disc or a 10-mesh back-up screen 25 and an adjacent 100-mesh screen 26. A gasket 27, preferably constructed of compressed asbestos, is located against the screen 26 and is pressed against the inner wall of the housing section 12 to provide a seal. For reasons which will later appear, a pad 30 of inorganic fibrous material such as fiberglass is located across and against the gasket 27, the pad 30 constituting an important part of the filter media.

Disposed in the outlet housing section 12 is a substantially conical, wire form 31, the larger end 32 of which is located against the filter pad 30 and gasket 27, and pressed against or otherwise secured to the inner wall of the housing section 12. The small end 33 of the wire form 31 extends toward the opening of the housing section 12 provided by the rim 17. Specifically, the small end 33 of the wire form 31 engages the perforated plate 23 and is compressed between the plate 23 and the housing section 12.

Located in the wire form 31 is a filter media 34 of an inorganic fibrous material such as fiberglass, the filter media 34 being contained in the wire form 31 and assuming its substantially conical shape. This filter media 34 extends substantially between and engages the perforated plate 23 and the filter pad 30, and thereby provides a large primary outlet filter area downstream of the adsorbent material bed 21 through which the refrigerant must pass. The wire form 31 and filter media 34 are laterally and annularly spaced from the housing section 12 upstream of the gasket seal to enable refrigerant flow around and through the filter media 34.

Because the wire form 31 is secured to the outlet housing section 12, a self-contained subassembly is provided.

An outlet fitting 35 is attached to the outlet housing section 12 downstream of the screens 25–26, the outlet fitting 35 providing an outlet for the refrigerant flow through the filter-drier. The outlet fitting 35 is adapted to be attached in the line of a refrigeration system.

The screen 26 serves to retain the fiberglass filter media 34 and pad 30. The back-up screen or perforated metal disc 25 provides additional support. The gasket 27 retains the screens 25 and 26 in the outlet housing section 12. The gasket 27 prevents bypassing of the filter media by the liquid flowing through the filter-drier. Although the gasket 27 provides a positve seal, it can be eliminated by compressing and sandwiching the pad 30 between the wire form end 32 and the housing wall. This structure will provide a satisfactory seal and assure that the refrigerant will flow through the filter media 34 and the filter pad 30.

The filter media 34 could be composed of materials other than fiberglass, although fiberglass is preferred. For example, inorganic fibrous material such as rock wool, bronze wool, copper wool, lead wool, steel wool, stainless steel wool, and aluminum wool would be satisfactory under certain conditions. The use of these materials would give significant variations in the filtering ability because of the variation in the fiber size, density and ability to pack these various materials.

It has been found that varying the density of the fiberglass has a direct effect on the filtering capability of the unit. The volume within the compressed wire form 31 on one side and the 100-mesh outlet screen 26 on the other side represents the volume of fiberglass that is used as a filtering media. By changing the size of the fiberglass pads used to form this filter media or by keeping the same size pads and changing the density of the basic fiberglass sheeting, the density of the fiberglass within the confined space of the filter-drier can be controlled. It has been found that best results are obtained within the range of 0.5 to 5.0 grams per cubic inch density of the fiberglass. For example, tests show that at 2.3 grams per cubic inch fiberglass density, a dirt capacity of 10 grams and a filtration efficiency of 90 percent is achieved. When the amount of fiberglass is increased up to 5.1 grams per cubic inch, the dirt capacity drops to 5.3 grams and the filtration efficiency increases to 95 percent. It is clear that the filtration capability of this filter media can be varied by preselecting the density. In certain circumstances, one may be able to permit some dirt particles to go through, but wish to collect a large amount before plug-up. Under these circumstances, the 3.2 grams per cubic inch density would be ideal. Using a higher density decreases the amount of dirt collected before plug-up, but increases the amount of dirt removed in one pass through the filter. The 0.5 to 5.0 grams per cubic inch density is a preferred range.

The wire form 31 is a conical compression spring in the embodiment of FIGS. 1 and 2. In assembly of the housing sections 11 and 12, the small end 33 of the spring would fit over and be retained by a projection 36 on the perforated plate 23, and the spring would be compressed between the plate 23 and the housing section 12.

The outlet screens 25 and 26 could be of many different porous filter means such as perforated metal, sintered metal and the like. Such outlet filter means should have sufficient strength to bridge the housing section 12 and must be capable of collecting small fibers of the filter media 34 and pad 30 that might be loosened.

When the filter-drier is connected in a refrigeration line, the refrigerant flows into the inlet housing section 11 through the inlet fitting 15, past the perforated plate 22 and through the adsorbent material bed 21 where contaminants such as water, acid and wax are removed. The refrigerant then flows through the perforated plate 23, through the annular space between the media 34 and housing section 12, and through the large filtering surface provided by the filter media 34 and filter pad 30 where contaminant particles are removed. The refrigerant then flows through the screens 25 and 26 and outwardly of the outlet housing section 12 through the outlet fitting 35. The flat filter pad 30 at the outlet end serves as a secondary filter and collects loose glass fibers which might easily come loose from the cut edge of the filter media 34. The pad 30 performs this last function effectively because it is flat, and because the glass fibers comprising the pad 30 are oriented across the final outlet screens 25 and 26 instead of being disposed endwise. Any loosened fibers of the filter media 34 and filter pad 30 are also retained by the screens 25 and 26.

Figure 3:
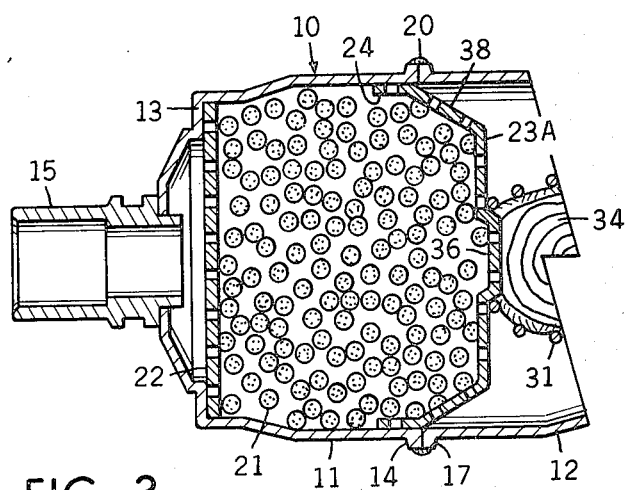
FIG. 3 is a fragmentary, longitudinal cross-sectional view illustrating a modified construction.

A modification in the construction, illustrated in FIG. 3, makes it possible to modify or balance the performance qualities of the filter-drier for a given application. For example, the perforated plate 23A includes an extension portion 38 that causes the cup-shaped perforated plate 23A to bulge or extend outwardly of the inlet housing section 11 and into the outlet housing section 12 when the housing sections 11 and 12 are interconnected. This construction enables a greater volume of an adsorbent material bed 21 to be obtained while sacrificing the amount of surface area provided by the filter media 34. Conversely, the wire form 31 can be extended further into the inlet housing section 11, while the perforated plate 23 is shaped to reduce the volume of the adsorbent material bed 21. This construction would increase the surface area of the filter media 34. Similar adjustments can be obtained by adjusting the lengths of the respective inlet and outlet housing sections 11 and 12.

Figure 5:
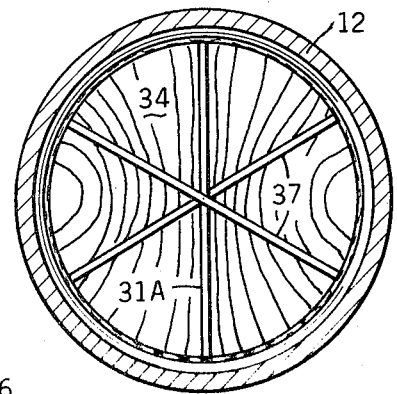
FIG. 5 is a cross-sectional view as taken on line 5—5 of FIG. 4.
Figure 4:
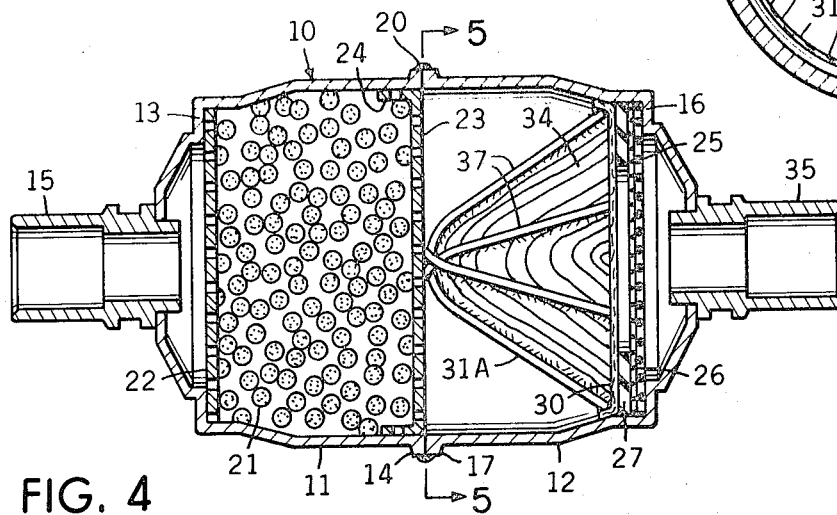
FIG. 4 is a longitudinal cross-sectional view of a modified construction of the filter-drier.

FIGS. 4 and 5 illustrate another modified construction of the filter-drier. In this embodiment, the wire form 31A consists of a plurality of angularly related, bent wire legs 37 welded at their common apex. The apex end of the wire cage 31A bears against the perforated plate 23 and is preferably slightly compressed on assembly so that the wire form 31A is held in position.

In assembling the filter-drier, the perforated plate 13 is disposed against the shoulder 13 of the inlet housing section 11 and the adsorbent material bed 21 is placed in the housing section 11 preferably while the housing section 11 is vibrated to compact the bed 21 and minimize attrition in service. Then, the cup-shaped perforated plate 23 is forced into place to provide a self-contained subassembly.

The other self-contained subassembly is made by placing the screens 25 and 26 against the housing shoulder 16 of the outlet housing section 12. The gasket 27 is pressed into place against the screen 26 and against the inner wall of the housing section 12 to provide an effective seal. The fiberglass filter pad 30 is then disposed across and against the gasket 27. The fiberglass filter media 34 is stuffed into the wire form 31, and the wire form 31 is placed into the outlet housing section 12 and secured to the housing section 12 preferably by pressing the large end 32 into the housing with the pad 30 compressed and sandwiched between the end 32 and the housing wall.

The rims 14 and 17 are placed into abutment, at which time the wire form 31 engages and is compressed by the perforated plate 23 between the plate 23 and shoulder 16 of the outlet housing section 12. While the rims 14 and 17 are held in engagement, the inlet and outlet housing sections 11 and 12 are joined by a single weld 20.

Figure 6:
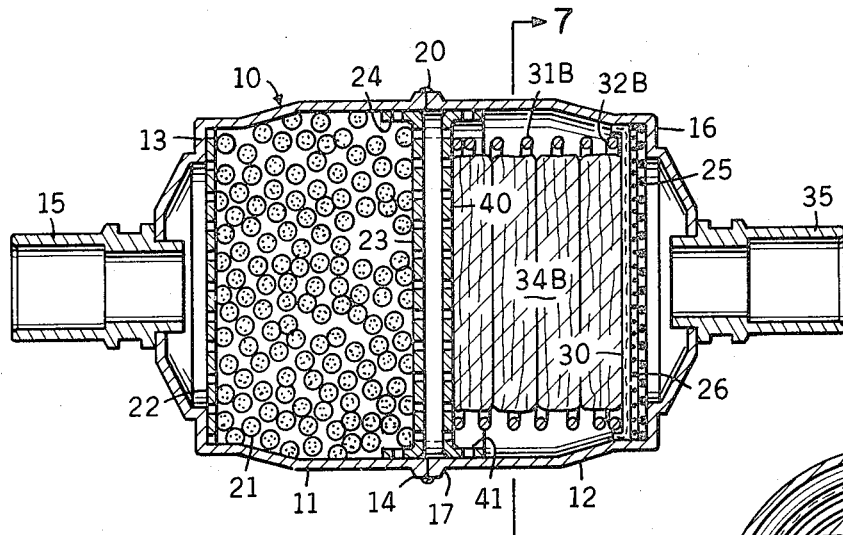
FIG. 6 is a longitudinal cross-sectional view of a modified construction of the filter-drier.
Figure 7:
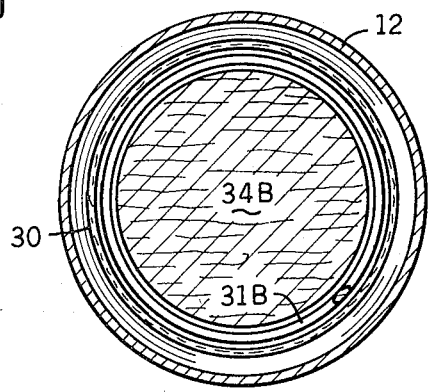
FIG. 7 is a cross-sectional view as taken on line 6—6 of FIG. 6.

FIGS. 6 and 7 illustrate another modified construction of the filter-drier. In this embodiment, the wire form 31B is a cylindrical spring having an inner end 32B. A cup-shaped, perforated plate 40 includes a peripheral flange 41 that is pressed against or otherwise secured to the inside wall of the housing section 12 just inwardly of the opening defined by the housing rim 17. The plate 40 contains the wire form 31B in its compressed state. The filter media 34B contained within the wire form 31B consists of a plurality of circular pads which assume the cylindrical shape of the wire form 31B and extend between the filter pad 30 and the perforated plate 40.

The circular pads of filter media 34B are made of somewhat softer fiberglass than the outlet filter pad 30. These pads are cut to be a compressed fit in the spring constituting the wire form 31B to be properly retained. The amount of compression of these pads determines to a great extent, the amount of dirt held before clogging and also the filtering efficiency. The amount of compression is determined by the number and thickness of the pads and the amount of space between the outlet pad 30 and the perforated plate 40. The outlet pad 30 in the embodiment of FIG. 6, as well as in the embodiments of FIGS. 1 and 4, is cut large enough to fold around the compression spring 31B to seal between the housing section 12 and the pads constituting the filter media 34 B. This outlet pad 30 is made of long fiber, fiberglass, and is impregnated with a resin binder to prevent fibers from breaking away. The binder is greater on one side surface which is disposed toward the outlet. The outlet pad 30 then will seal off any fibers that break away from the pads of filter media 34B.

In assembling the self-contained subassembly of housing section 12, the screens 25 and 26 are placed against the housing shoulder 16 of the outlet housing section 12. The fiberglass filter pad 30 is then disposed across the screen 25 with its peripheral edge compressed and sandwiched between the spring end 32B and the inner wall of the housing section 12. The fiberglass filter media 34B comprising the circular pads is stuffed into the wire form 31B before insertion of the wire form 31B into the housing section 12, and then the perforated plate 40 is pressed into place.

In assembling the filter-drier, the rims 14 and 17 of the housing sections 11 and 12 are placed into abutment, at which time the perforated plate 40 is spaced from the perforated plate 23 to avoid the blockage of the apertures in such plates. While the rims 14 and 17 are held in engagement, the inlet and outlet housing sections 11 and 12 are joined by a single weld 20.

Figure 8:
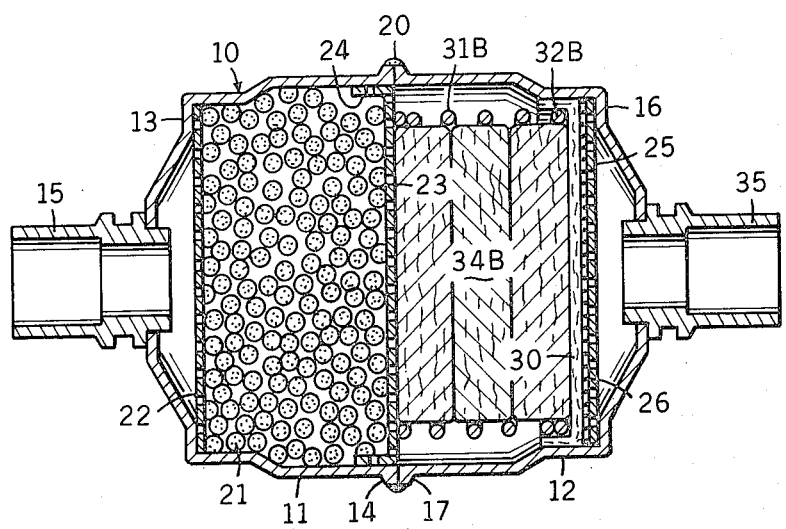
FIG. 8 is a longitudinal cross-sectional view of a modified construction of the filter-drier.

FIG. 8 illustrates an embodiment that is similar to that of FIGS. 6 and 7, but without the perforated plate 40. The cylindrical spring engages the perforated plate 23 and the outlet pad 30 as the wire forms 31 and 31A do in the embodiments of FIGS. 1 and 4 respectively. During assembly of the self-contained subassembly of housing section 12, the spring end 32B compresses the peripheral edge of the outlet pad 30 against the wall of housing section 12 to provide a seal. This sealing pressure of spring end 32B retains the wire form 31B and other component parts in housing section 12 in assembly, and thereby facilitate handling.

We claim as our invention:

1. A filter-drier for refrigeration systems, comprising:
  a. a housing having an inlet at one end and an outlet at the other end,
  b. an adsorbent material bed contained in the housing,
  c. an elongate, hollow wire form disposed in the housing downstream of the adsorbent material bed, the wire form having one end arranged toward the outlet and its other end disposed toward the adsorbent material bed,
  d. a filter media of inorganic fibrous material disposed in the wire form and assuming the shape of the wire form, the filter media extending substantially across the housing,
  e. the adsorbent material bed being located adjacent the housing inlet and spaced from the housing outlet,
  f. the wire form extending substantially to and between the adsorbent material bed and the housing outlet,
  g. the filter media contained in the wire form being of fiberglass having a density within the range of substantially 0.5 grams per cubic inch to substantially 5.0 grams per cubic inch,
  h. a pad of fiberglass having a density within the same range as that fiberglass contained in the wire form, located adjacent to and downstream of the filter media contained in the wire form, and pressed against the housing to assure flow through the filter media, and
  i. the outlet pad being impregnated with a resin binder and having a greater amount of binder on its outlet side to seal off any fibers that break away from the filter media.

2. In a filter-drier for refrigeration systems, comprising:
  a. a housing including an inlet housing section and an outlet housing section, the inlet housing section being provided with an inlet, and the outlet housing section being provided with an outlet,
  b. the housing sections having compatible housing rims that are joined,
  c. an elongate, hollow wire form secured in the outlet housing section with one end arranged toward the outlet and with the other end arranged toward the opening defined by the outlet housing section rim,
  d. a filter media of inorganic fibrous material contained in the wire form and assuming the shape of the wire form, the wire form holding the filter media in the outlet housing section,
  e. the outlet housing section constituting a self-contained subassembly,
  f. the filter media contained in the wire form being of fiberglass having a density within the range of substantially 0.5 grams per cubic inch to substantially 5.0 grams per cubic inch,
  g. the wire form being a compression spring,
  h. a pad of fiberglass having a density within the range as that contained in the wire form, located adjacent to and downstream of the fiberglass contained in the wire form, and
  i. the outlet pad being impregnated with a resin binder and having a greater amount of binder providing a continuous edge to edge binder coating on its outlet side to seal off any fibers that break away from the filter media.

3. In a filter-drier for refrigeration systems, comprising:
  a. a housing including an inlet housing section and an outlet housing section, the inlet housing section being provided with an inlet, and the outlet housing section being provided with an outlet,
  b. the housing sections having compatible housing rims that are joined,
  c. an adsorbent material bed in the inlet housing section,
  d. a foraminate means containing the adsorbent material bed and fixed to the inlet housing section to provide a self-contained subassembly,
  e. an elongate, hollow wire form is secured in the outlet housing section with one end arranged toward the outlet and with the other end arranged toward the opening defined by the outlet housing section rim,
  f. a filter media of inorganic fibrous material is contained in the wire form and assumes the shape of the wire form,
  g. the outlet housing section constituting a self-contained subassembly,
  h. the foraminate means being a pair of spaced, perforated plates extending across the housing and containing the adsorbent material bed therebetween, the perforated plate downstream of the adsorbent material bed being secured to the inlet housing section to provide the self-contained subassembly, and
  i. the said other end of the wire form engaging and being compressed against the said one perforated plate.

4. In a filter-drier as defined in claim 3, in which:
  j. the wire form is a compression spring, and
  k. the said one perforated plate includes a projection interfitting the said other end of the compression spring to position the spring.

5. In a filter-drier as defined in claim 3, in which:

j. means is provided downstream of the filter media to assure flow through the filter media, k. a pad of inorganic fibrous material is located adjacent to and downstream of the filter media contained in the wire form, and l. the filter media contained in the wire form and the pad are of fiberglass having a density within the range of substantially 0.5 to substantially 5.0 grams per cubic inch.

6. In a filter-drier for refrigeration systems, comprising:

a. a housing including an inlet housing section and an outlet housing section, the inlet housing section being provided with an inlet, and the outlet housing section being provided with an outlet, the housing sections having compatible housing rims that are joined, b. an elongate, hollow wire form secured in the outlet housing section with one end arranged toward the outlet and with the other end arranged toward the opening defined by the outlet housing section rim, c. a filter media of inorganic fibrous material contained in the wire form and assuming the shape of the wire form, d. a perforated plate secured to the outlet housing section and retaining the wire form and its enclosed filter media to provide a self-contained subassembly, e. the wire form being a substantially cylindrical, compression spring, and f. the filter media contained in the spring being fiberglass having a density within the range of substantially 0.5 to substantially 5.0 grams per cubic inch.

7. In a filter-drier as defined in claim 6, in which:

g. the fiberglass filter media is a plurality of stacked pads compressed within the spring.

8. In a filter-drier as defined in claim 7, in which:

h. the outlet pad is impregnated with a resin binder and having a greater amount of binder providing a continuous edge to edge binder coating on its outlet side to seal off any fibers that break away from the stacked pads.

9. In a filter-drier as defined in claim 6, in which:

e. an adsorbent material bed in the inlet housing section, f. a pair of spaced, perforated plates extending across the inlet housing section, the adsorbent material bed being contained in the inlet housing section between the said pair of perforated plates, g. one of the last said pair of perforated plates downstream of the adsorbent material bed is secured to the inlet housing section to provide a self-contained subassembly, and h. the last said one perforated plate of the inlet housing section is axially spaced from the perforated plate secured to the outlet housing section to preclude blockage of the apertures in such plates.

* * * * *